Patented Oct. 28, 1930

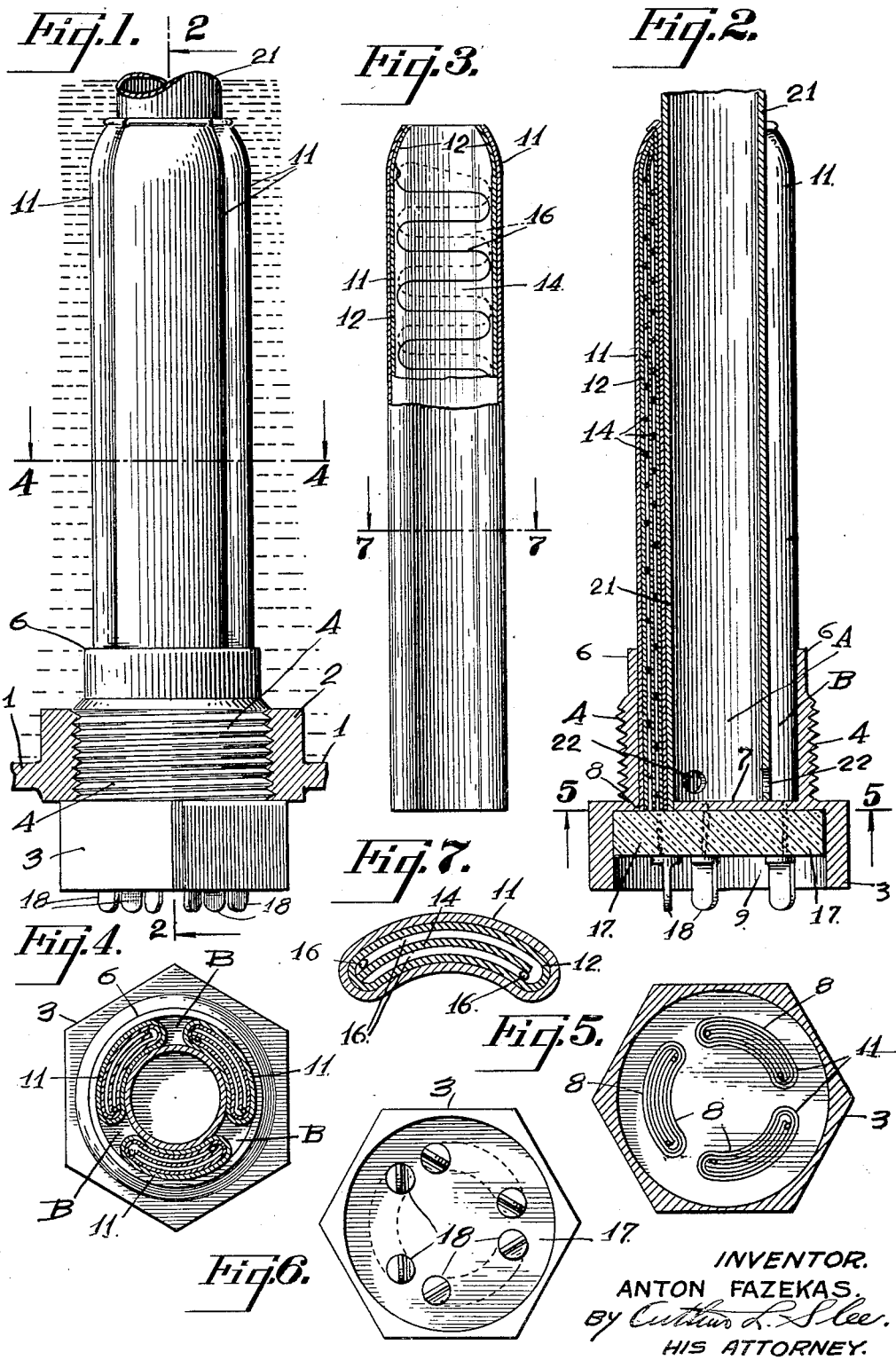

1,779,668

UNITED STATES PATENT OFFICE

ANTON FAZEKAS, OF SAN FRANCISCO, CALIFORNIA

VARIABLE ELECTRIC HEATER

Application filed September 27, 1929. Serial No. 395,552.

My invention relates to improvements in variable electric heaters wherein a head, adapted for insertion into preferably the lower end of a fluid container, is provided with an annular collar within which vertically disposed heating elements, each of different heating capacity, are arranged in parallel spaced relation to form a heating chamber surrounded by said heating elements and operate in conjunction with a tube within said chamber and in contact with said elements, said tube having an open upper end and entrance ports adjacent the lower end thereof, to facilitate the circulation of fluid through said tube whereby, when any or several or all of said electric heating elements are energized, fluid within said tube may be circulated and heated to various or required degrees of temperature.

The primary object of the present invention is to provide a new and improved variable electric heater for heating water quickly and economically to varying degrees of temperature.

Another object is to provide a new and improved article of manufacture of the character described of simple and economic construction and of a maximum efficiency.

A further object is to provide a new and improved device of the character described having improved means for facilitating circulation of fluid through the heater by retarding circulation of said fluid within a confined chamber until a degree of temperature has been attained which will produce a pressure sufficient to forcibly eject said fluid from said chamber and thereby forcibly draw, or cause to be circulated through said chamber, surrounding fluid of a lower temperature.

I accomplish these and other objects by means of the improved device disclosed in the drawings forming a part of the present application wherein like characters of reference are used to designate similar parts through the specification and drawings, and in which—

Fig. 1 is an elevation of my improved variable heater, showing the manner of attachment to a portion of a fluid container, shown in section;

Fig. 2 is a vertical longitudinal sectional view taken on line 2—2 of Fig. 1 in the direction indicated;

Fig. 3 is a broken detailed view of one of the heating elements, partly in section;

Fig. 4 is a transverse sectional view taken on line 4—4 of Fig. 1 in the direction indicated;

Fig. 5 is a transverse sectional view taken on line 5—5 of Fig. 3 in the direction indicated;

Fig. 6 is a bottom plan view of the device; and

Fig. 7 is an enlarged transverse sectional view of one of the electrical heating elements.

Referring to the drawings the numeral 1 is used to designate a portion of a fluid container having an internally threaded aperture 2 within which is screwed a head 3 provided with a threaded portion 4 engaging the threaded aperture 2 of the container 1, said head 3 being also provided with a vertically disposed and upwardly extending annular collar 6, the purpose of which will hereinafter be more fully set forth.

The head 3 is provided with a horizontally disposed or transverse wall 7 provided with a plurality of arcuate apertures 8 arranged in circular form and below said wall 7 is a recess 9.

A plurality of vertically disposed hollow arcuate electric heating elements 11, each of a different heating capacity, are mounted within their lower ends tightly fitted within the apertures 8 of the wall 7 and extend upwardly therefrom, said heating elements 11 being each provided with two outer layers of insulation 12 and an inner insulation 14 mounted midway between said outer layers, and in the space thus provided a suitable double resistance or heating coil 16 is provided, thus providing inner and outer heating coils 16 as disclosed in greatly enlarged section in Fig. 7 of the drawings, so that the heating elements 11 are provided with heating means for their inner, as well as their outer, surfaces.

These heating elements 11, are mounted within the arcuate apertures 8 and extend through the wall 7 and within the annular collar 6 and in parallel spaced relation to each other so as to form a heating chamber A surrounded by said heating elements 11, the spaces between said spaced heating element 11 forming entrance ports to said heating chamber A. By mounting the said elements 11 within said apertures 8 and within the annular collar 6, said elements 11 are thus effectively held in proper spaced relation to each other to maintain proper spaces for entrance ports.

A suitable plate 17 of insulating material is mounted within the circular recess 9 below the wall 7, and is provided with a pair of suitable electrical terminals 18 for each heating element 11, said terminals 18 being arranged for engagement to suitable conductors and controlling devices, which, forming no part of the present invention, are not illustrated or described herein.

If desired, a tube 21 may be inserted within the heating chamber A and in contact with the internal arcuate surfaces of the heating elements 11, said tube being provided with comparatively small apertures or entrance ports 22 arranged adjacent the lower end of the said tube 21, said tube 21 also forming additional small heating chambers B between the adjacent edges of the elements 11, the outer surface of the tube 21 and the internal surface of the annular collar 6, as disclosed in Figs. 2 and 4 of the drawings.

In operation, the device is screwed into the wall of a fluid container as disclosed in Fig. 1 of the drawings, and by energizing said electrical heating elements 11, by any suitable source of electrical energy not shown, said elements may be energized and radiate heat into the surrounding fluid.

It is obvious that the fluid within the heating chamber A and within the collar 6 will be confined as in a pocket, there being no means for facilitating or promoting circulation within said pocket. As the temperature of the fluid within said pocket or heating chamber A rises to a sufficient degree the pressure produced by said rise in temperature will cause the fluid in said pocket or heating chamber A to be suddenly ejected upwardly and be replaced by colder and denser surrounding fluid which will in turn be heated and ejected and such operation will continue until all of the fluid within said container 1 has attained the required degree of temperature.

When the tube 21 is employed, the circulation of fluid within said pocket or heating chamber A will be retarded to an even greater extent, as well as fluid within the pockets B, until fluid in said pockets or chambers A and B has been ejected as above described, after which ejection, surrounding fluid will be drawn into the pockets or chambers B and from thence, through the apertures 22, into the heating chamber A.

When the tube 21 is used the heated fluid will be ejected with considerable force upwardly through the tube 21 and a greater amount of heated fluid will be thereby displaced than when ejected without the tube and through the spaces between the heating elements 11, thereby effecting a greater displacement and consequently a greater circulation will be effected, as retarding of the fluid, while being heated within the chamber A, will produce an ejection of a greater amount of fluid within the tube 21 and thereby produce a greater circulation.

By providing a plurality of heating elements 11, each of a different heating capacity, any, or several, or all, of said elements may be energized and thereby produce various degrees of temperature to the surrounding fluid. For instance, all elements 11 may be energized to obtain the highest degree of heat within the shortest period possible, and after said degree of temperature has been attained, the element of greatest heating capacity may be de-energized and the remaining elements, or even the element of lowest heating capacity, may be left energized to retain the degree of heat already attained.

Having thus described my invention what I claim as new and desire to secure by Letters Patent is:—

1. A variable electric heater comprising a plurality of electric heating elements of arcuate cross section symmetrically disposed about a central axis and arranged in parallel spaced relation to each other and forming a central chamber surrounded by said elements, said spaced relation forming entrance ports to said chamber whereby a fluid being heated by said elements may circulate through said chamber.

2. A variable electric heater comprising a plurality of longitudinally disposed arcuate electric heating elements each of a different heating capacity arranged in parallel spaced relation to each other to form a central chamber surrounded by said elements, said chamber having entrance ports formed by the spaces between said elements, whereby a fluid to be heated may circulate through said chamber and may be heated to various degrees of temperature.

3. A variable electric heater comprising a head; and a plurality of longitudinally disposed arcuate electric heating elements secured at one end to said head and arranged in parallel spaced relation to form a heating chamber surrounded by said elements, said chamber having entrance ports formed by said spaces between said elements and open at one end, said elements being of different heating capacities.

4. A variable electric heater comprising a threaded head adapted for insertion into a container for heating fluid and having an annular collar forming a chamber in said head;

and a plurality of arcuate electric heating elements each of different heating capacity mounted within said annular collar in longitudinally disposed parallel spaced relation and extending beyond said collar to form a heating chamber surrounded by said elements, said chamber having entrance ports formed by said spaced relation and being open at one end to form an outlet whereby fluid may circulate through said chamber and be heated to various degrees of temperature by energizing any one, or several, or all of said heating elements.

5. A variable electric heater comprising a plurality of vertical electric heating elements arranged to form a central heating chamber surrounded by said elements; a tube mounted within said chamber and in contact with said elements, said tube being open at one end and closed at the other end and having apertures adjacent said closed end, whereby fluid within said chamber and tube may be ejected from the open end thereof by pressure due to expansion when said fluid is heated to a sufficient degree of temperature and thereby draw colder and denser surrounding liquid into said chamber through said apertures to facilitate circulation of fluid through said chamber and subsequent heating of the same.

6. A variable electric heater comprising a plurality of vertically disposed arcuate electric elements arranged in parallel spaced relation to form a heating chamber surrounded by said elements; and a tube mounted within said elements and in contact therewith, said tube being open at its upper end and closed at its lower end and provided with a plurality of apertures adjacent the lower end thereof and opposite the spaces between said elements whereby fluid within said tube may be ejected therefrom by pressure due to expansion when said fluid is heated to a sufficient degree by said heating elements and thereby facilitate the circulation of fluid to be heated through said chamber.

7. A variable electric heater comprising a head adapted for insertion into the lower end of a fluid container and having an annular collar on the upper end thereof forming a chamber; a plurality of vertically disposed arcuate electric heating elements each of different heating capacity having their lower ends mounted within said collar and extending upwardly beyond the top of said collar, said elements being arranged in parallel spaced relation to form a heating chamber surrounded by said elements; and a tube mounted within said elements and in contact therewith, said tube being open at the upper end thereof and closed at its lower end seated within said head, and provided with apertures adjacent said lower ends arranged opposite the spaces between said elements to provide entrance ports for said heating chamber thus formed within the lower end of said tube whereby fluid within said tube may be ejected therefrom by pressure due to expansion caused by heat from said elements when the same are energized and thereby facilitate the circulation of fluid through said heating chamber.

In witness whereof, I hereunto set my signature.

ANTON FAZEKAS.